United States Patent
Phelps et al.

(10) Patent No.: US 9,330,520 B2
(45) Date of Patent: May 3, 2016

(54) DETECTION AND MANAGEMENT OF PORTABLE ELECTRONIC DEVICES IN SECURE COMPARTMENTS OF CHARGING STATIONS

(71) Applicant: Brightbox, Inc., New York, NY (US)

(72) Inventors: Jack Standish Phelps, Brooklyn, NY (US); William W. Gridley, New York, NY (US); Adam Hubbard Johnson, New York, NY (US)

(73) Assignee: BRIGHTBOX, INC., New York, NY (US)

( * ) Notice: Subject to any disclaimer, the term of this patent is extended or adjusted under 35 U.S.C. 154(b) by 390 days.

(21) Appl. No.: 13/907,905

(22) Filed: Jun. 1, 2013

(65) Prior Publication Data

US 2014/0354214 A1    Dec. 4, 2014

(51) Int. Cl.
*G07F 15/00* (2006.01)
*H02J 7/00* (2006.01)

(52) U.S. Cl.
CPC ............... *G07F 15/00* (2013.01); *H02J 7/0027* (2013.01)

(58) Field of Classification Search
CPC ............................... H02J 7/0036; H02J 7/0044
USPC .......................................................... 320/107
See application file for complete search history.

(56) References Cited

U.S. PATENT DOCUMENTS

| | | | |
|---|---|---|---|
| 8,069,100 B2* | 11/2011 | Taylor | G06Q 20/10 320/108 |
| 9,043,217 B2* | 5/2015 | Cashman | E04H 3/08 705/2 |
| 2003/0141840 A1* | 7/2003 | Sanders | H02J 7/0042 320/107 |
| 2011/0301748 A1* | 12/2011 | Lecarpentier | H04M 19/08 700/232 |
| 2012/0078413 A1* | 3/2012 | Baker, Jr. | G07F 17/12 700/232 |
| 2012/0129577 A1* | 5/2012 | Vaknin | H02J 7/0027 455/573 |
| 2014/0278994 A1* | 9/2014 | Greenwood | H04B 1/3883 705/14.55 |

* cited by examiner

*Primary Examiner* — Drew A Dunn
*Assistant Examiner* — Jerry D Robbins
(74) *Attorney, Agent, or Firm* — Husch Blackwell LLP

(57) ABSTRACT

The disclosed embodiments provide a charging station for portable electronic devices. Upon initiating a transaction associated with charging of the portable electronic device by the charging station, the charging station attempts to detect a presence of the portable electronic device in a secure compartment of the charging station, wherein power is supplied to the portable electronic device within the secure compartment. If the presence of the portable electronic device in the secure compartment is detected, the charging station secures a door of the secure compartment. If the presence of the portable electronic device in the secure compartment is not detected, the charging station queries a user of the portable electronic device for input related to a lack of detection of the presence and processes the transaction based on the input.

5 Claims, 4 Drawing Sheets

DETECTION AND MANAGEMENT OF PORTABLE ELECTRONIC DEVICES IN SECURE COMPARTMENTS OF CHARGING STATIONS

RELATED APPLICATION

The subject matter of this application is related to the subject matter in a co-pending non-provisional application by inventors Jack S. Phelps and Adam H. Johnson, entitled "Managing the Use of Secure Compartments in Charging Stations for Portable Electronic Devices," having Ser. No. 13/298,888 and filing date 17 Nov. 2011.

BACKGROUND

1. Field

The disclosure relates to charging stations for portable electronic devices. More specifically, the disclosure relates to techniques for detecting and managing portable electronic devices in secure compartments of charging stations for the portable electronic devices.

2. Related Art

Rechargeable batteries are commonly used to power a variety of portable electronic devices, such as laptop computers, tablet computers, mobile phones, personal digital assistants (PDAs), digital cameras, and/or portable media players. The capacities and/or runtimes of such batteries may vary based on the power consumption of the portable electronic devices, usage of the portable electronic devices, the size and chemistry of the batteries, and/or the age of the batteries. For example, a single charge on a smart phone's battery may last multiple days if the smart phone is in standby mode and for less than a day if the smart phone is constantly used to browse the web, send and receive emails, play games, view documents, and/or make phone calls. Similarly, a rechargeable battery's capacity may gradually decrease over time, with the battery reaching an end-of-life when the battery's capacity drops to a percentage (e.g., 70-80%) of the battery's initial capacity.

Continued use of a portable electronic device without recharging the portable electronic device's battery may deplete the battery and interrupt the use of the portable electronic device. At the same time, the portable electronic device's location may be inconvenient and/or unsafe for recharging of the battery. For example, a user may receive a warning from his/her mobile phone after the mobile phone's battery level falls below 15%. If the user continues using the mobile phone without charging the battery, the battery may run out of charge, and the mobile phone may switch off. Once the battery is dead, the user may be unable to restore operation of the mobile phone until the user has access to a suitable phone charger and/or power outlet. Moreover, the user may risk damage to and/or theft of the mobile phone if the user attempts to charge the mobile phone in a public setting such as a restaurant, bar, airport, and/or gym.

Consequently, uninterrupted use of portable electronic devices may be facilitated by mechanisms for securely charging the portable electronic devices in public settings.

SUMMARY

The disclosed embodiments provide a charging station for portable electronic devices. Upon initiating a transaction associated with charging of the portable electronic device by the charging station, the charging station attempts to detect a presence of the portable electronic device in a secure compartment of the charging station, wherein power is supplied to the portable electronic device within the secure compartment. If the presence of the portable electronic device in the secure compartment is detected, the charging station secures a door of the secure compartment. If the presence of the portable electronic device in the secure compartment is not detected, the charging station queries a user of the portable electronic device for input related to a lack of detection of the presence and processes the transaction based on the input.

In one or more embodiments, if the input is not received from the user within a first pre-specified period, the charging station operates the secure compartment with an assumed presence of the portable electronic device in the secure compartment, and periodically reattempts to detect the presence of the portable electronic device in the secure compartment.

In one or more embodiments, if the presence of the portable electronic device in the secure compartment is not detected after a second pre-specified period, the charging station ends the transaction and identifies the secure compartment as unoccupied.

In one or more embodiments, initiating the transaction associated with charging of the portable electronic device by the charging station involves selecting the secure compartment for use with the portable electronic device based on at least one of:
  (i) a set of ongoing transactions with the charging station;
  (ii) a set of recently ended transactions with the charging station;
  (iii) a number of uses of the secure compartment; and
  (iv) a compatibility of a connector in the secure compartment with the portable electronic device.

In one or more embodiments, initiating the transaction associated with charging of the portable electronic device by the charging station involves obtaining an identifier for the user that does not match an ongoing transaction associated with charging of the portable electronic device by the charging station.

In one or more embodiments, the presence of the portable electronic device in the secure compartment is detected using at least one of a power consumption associated with the secure compartment and communication with the portable electronic device through a connector in the secure compartment.

In one or more embodiments, the communication is associated with transmission of at least one of a device identifier and a device type.

In one or more embodiments, upon detecting a presence of another portable electronic device in the secure compartment, the charging station queries the user for additional input related to the detected presence of the other portable electronic device and processes the transaction based on the additional input.

In one or more embodiments, the additional input includes at least one of removal of the other portable electronic device and an identifier for the user.

In one or more embodiments, processing the transaction based on the additional input involves ending the transaction and initiating a new transaction if the identifier does not match the transaction, and continuing the transaction with the other portable electronic device if the identifier matches the transaction.

In one or more embodiments, the input includes at least one of cancelling the transaction, connecting the portable electronic device to the charging station, and an identifier for the user.

In one or more embodiments, the charging station also activates a disinfecting mechanism within the secure compartment after securing the door of the secure compartment.

In one or more embodiments, the disinfecting mechanism includes an ultraviolet (UV) light disinfection mechanism.

BRIEF DESCRIPTION OF THE DRAWINGS

In the figures, like elements are denoted by like reference numerals.

DETAILED DESCRIPTION

In the following detailed description, numerous specific details are set forth to provide a thorough understanding of the disclosed embodiments. However, it will be apparent to those skilled in the art that the disclosed embodiments may be practiced without these specific details. In other instances, well-known features have not been described in detail to avoid unnecessarily complicating the description.

Methods, structures, apparatuses, modules, and/or other components described herein may be enabled and operated using hardware circuitry, including but not limited to transistors, logic gates, and/or electrical circuits such as application-specific integrated circuits (ASICs), field-programmable gate arrays (FPGAs), digital signal processors (DSPs), and/or other dedicated or shared processors now known or later developed. Such components may also be provided using firmware, software, and/or a combination of hardware, firmware, and/or software.

The operations, methods, and processes disclosed herein may be embodied as code and/or data, which may be stored on a non-transitory computer-readable storage medium for use by a computer system. The computer-readable storage medium may correspond to volatile memory, non-volatile memory, hard disk drives (HDDs), solid-state drives (SSDs), hybrid disk drives (HDDs), magnetic tape, compact discs (CDs), digital video discs (DVDs), and/or other media capable of storing code and/or data now known or later developed. When the computer system reads and executes the code and/or data stored on the computer-readable storage medium, the computer system performs the methods and processes embodied in the code and/or data.

Figure 1:
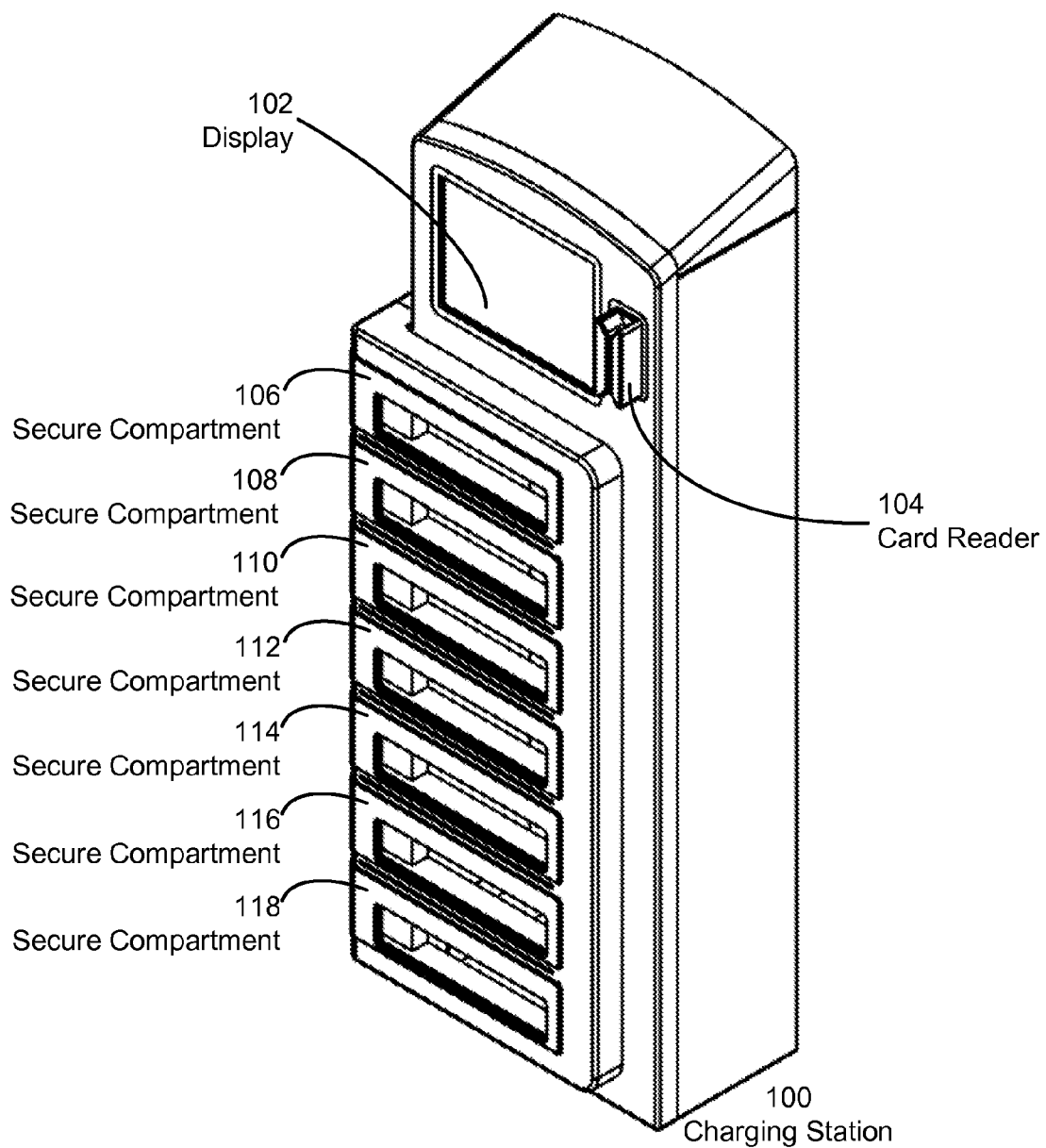
FIG. 1 shows a charging station in accordance with one or more embodiments.

FIG. 1 shows a charging station 100 in accordance with one or more embodiments. Charging station 100 may include a display 102, a card reader 104, and a set of secure compartments 106-118. Charging station 100 may be configured to charge a number of portable electronic devices, such as mobile phones, personal digital assistants (PDAs), tablet computers, portable media players, and/or other battery-powered electronic devices. For example, charging station 100 may be placed in a public location such as an airport, restaurant, bar, and/or gym to allow users at the location to charge their portable electronic devices, even if the users lack access to power outlets and/or chargers that are compatible with the portable electronic devices.

To prevent damage to and/or theft of the portable electronic devices during use of charging station 100, each portable electronic device may be placed in a secure compartment 106-118 (e.g., locker, box, safe, etc.) of charging station 100. A door to the secure compartment may be secured (e.g., locked) to restrict access to the portable electronic device and released (e.g., unlocked or opened) to allow placement of the portable electronic device into the secure compartment and removal of the portable electronic device from the secure compartment. Managing use of portable electronic devices with secure compartments 106-118 is discussed below with respect to FIG. 2.

Figure 2:
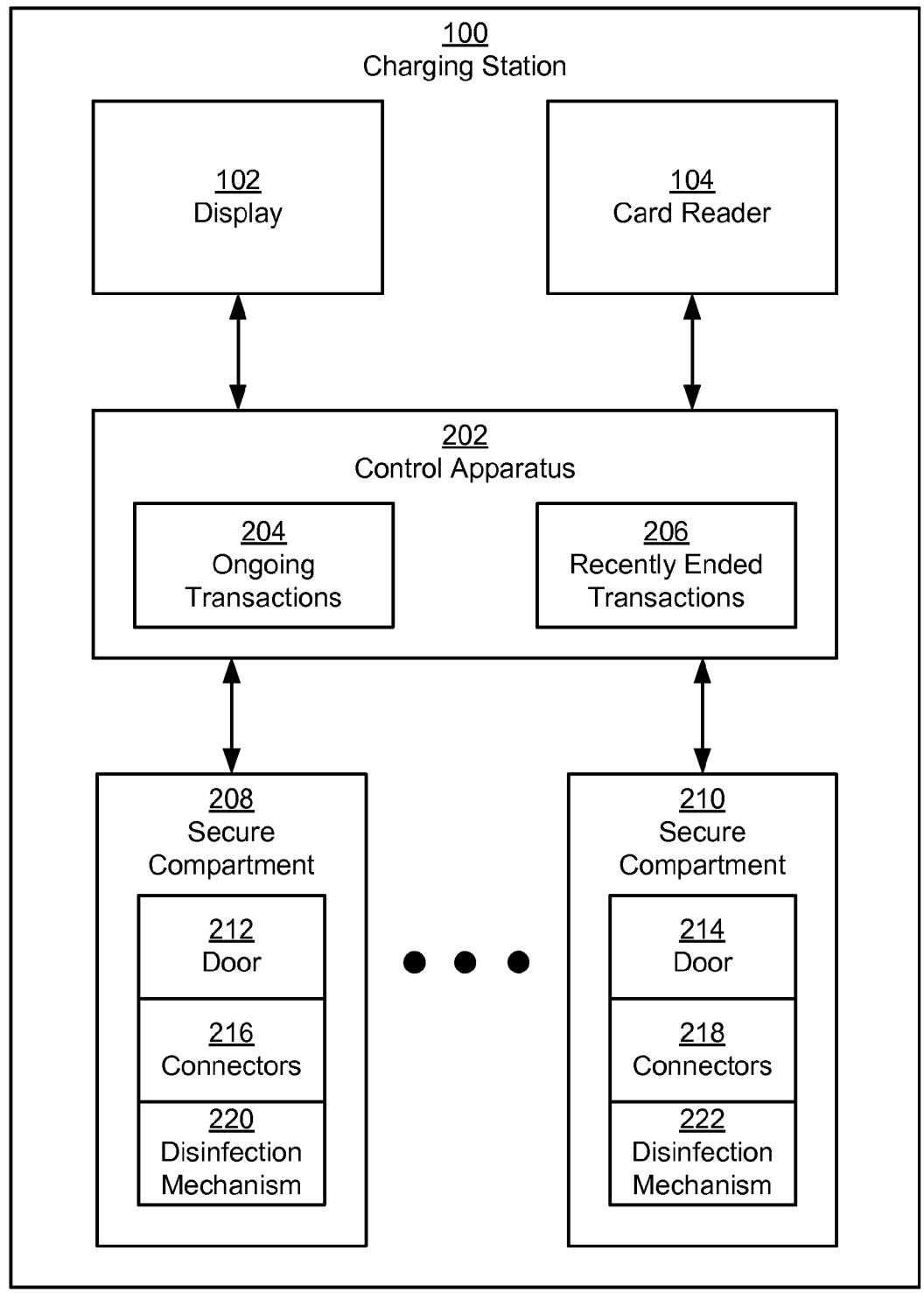
FIG. 2 shows a schematic of a system in accordance with one or more embodiments.

FIG. 2 shows a schematic of a system in accordance with one or more embodiments. More specifically, FIG. 2 shows a system for operating charging station 100. As shown in FIG. 2, a control apparatus 202 in charging station 100 may interact with a number of users through display 102, card reader 104, and/or other input/output (I/O) devices (not shown) in charging station 100.

Display 102 may correspond to a touchscreen that provides a graphical user interface (GUI) for interacting with charging station 100. During use of charging station 100, a user may provide touch-based input to the touchscreen and obtain instructions, prompts, and/or status information from the user interface shown within the touchscreen. Alternatively, display 102 may correspond to a non-touch-sensitive display that only displays graphical output to the user, and control apparatus 202 may obtain input from the user through card reader 104, a keypad, keyboard, set of buttons, and/or other input devices in charging station 100.

Card reader 104 may correspond to a magnetic-stripe reader that obtains payment information, such as credit card and/or debit card information, from the user. The payment information may then be used to charge the user a fixed or variable amount for using charging station 100 to charge the user's portable electronic device. Card reader 104 may also be configured to read a master card associated with administration of charging station 100. For example, an administrator may swipe the master card through card reader 104 to enable an administrative mode that allows the administrator to open doors 212-214 to secure compartments 208-210 in the charging station, change the brightness of display 102, restart charging station 100, and/or perform other tasks related to the management and/or troubleshooting of charging station 100.

During interaction with the user, control apparatus 202 may use card reader 104, display 102, and/or other I/O devices in charging station 100 to obtain input from the user to charging station 100. For example, control apparatus 202 may allow the user to select a secure compartment 208-210 by pressing a button next to the secure compartment and/or entering an identifier (e.g., numeric code) for the secure compartment into display 102 or a keypad. Control apparatus 202 may also obtain an identifier for the user, such as the payment information (e.g., credit or debit card number), a password, a numeric code (e.g., personal identification number (PIN)), personal information (e.g., name, email address, phone number, etc.), and/or biometric data (e.g., fingerprint, handprint, iris scan, etc.).

Control apparatus 202 may then use the input to manage the user's access to one or more secure compartments 208-210. As mentioned above, the user's portable electronic device may be charged within a secure compartment (e.g., secure compartments 208-210) to prevent damage to and/or theft of the portable electronic device.

In one or more embodiments, control apparatus 202 facilitates interaction with the user by allowing the user to provide the same input to initiate a transaction for charging a portable electronic device within a secure compartment, access the portable electronic device while the portable electronic device is charging within the secure compartment, and end the transaction. To enable such streamlined interaction, control apparatus 202 may track the user's input to charging station 100 and monitor the state of secure compartments 208-210 before, during, and after use of charging station 100 by the user, as discussed in a co-pending non-provisional application by inventors Jack Phelps and Adam Johnson, entitled "Managing the Use of Secure Compartments in Charging Stations for Portable Electronic Devices," having Ser. No. 13/298,888, and filing date 17 Nov. 2011, which is incorporated herein by reference.

In one or more embodiments, control apparatus 202 includes functionality to detect portable electronic devices in secure compartments 208-210 and manage use of secure compartments 208-210 with the portable electronic devices based on the detection. First, control apparatus 202 may identify initiation of a transaction associated with charging of a portable electronic device by charging station 100. As described in the above-referenced application, the user may initiate the transaction by providing payment information (e.g., credit card number) and/or another identifier (e.g., name, email address, password, numeric code, etc.) through display 102 and/or card reader 104. If the identifier does not match the identifier of any ongoing transactions 204 with charging station 100, control apparatus 202 may infer that the input relates to a new transaction, select an unused secure compartment 208-210 for use in charging the portable electronic device, and release (e.g., unlock, open, etc.) a door (e.g., doors 212-214) of the secure compartment.

In addition, control apparatus 202 may select the secure compartment to distribute use of charging station 100 among secure compartments 208-210 and/or facilitate use of connectors 216-218 in secure compartments 208-210. For example, control apparatus 202 may minimize wear on doors 212-214 of secure compartments 208-210 by selecting the least-used secure compartment (e.g., over the lifetime of charging station 100) and/or the secure compartment that has remained unused for the longest period. Alternatively, control apparatus 202 may rotate through secure compartments 208-210 with new transactions and/or perform random and/or near-random selection of the secure compartment. Control apparatus 202 may also allow the user to specify the type of connector (e.g., Micro-Universal Serial Bus (USB), 30-pin connector, Lightning (Lightning™ is a registered trademark of Apple Inc.)) to be used with the portable electronic device through display 102 and/or another input device. In turn, control apparatus 202 may select a secure compartment that contains the specified connector and/or facilitates allocation of remaining connectors 216-218 in unused secure compartments 208-210 among portable electronic devices in future transactions.

Similarly, control apparatus 202 may select the secure compartment in a way that mitigates issues associated with portable electronic devices that are accidentally left in secure compartments after transactions associated with charging the portable electronic devices have ended. First, control apparatus 202 may compare the input (e.g., identifier, payment information, etc.) provided by the user to information in a list of recently ended transactions 206. If the input matches a recently ended transaction from the list, control apparatus 202 may identify the secure compartment associated with the recently ended transaction (e.g., using a record of the recently ended transaction).

Control apparatus 202 may also release a door of the secure compartment if the secure compartment is not associated with an ongoing transaction (e.g., from ongoing transactions 204). As described in the above-referenced application, the user may then access the inside of the secure compartment and retrieve a portable electronic device that was left in the secure compartment and/or plug the portable electronic device into charging station 100 to resume the transaction associated with charging of the portable electronic device. Conversely, if the input does not match a recently ended transaction from the list of recently ended transactions 206, control apparatus 202 may select a secure compartment that was not recently used to reduce the likelihood of the user accessing a portable electronic device that was accidentally left in charging station 100 and/or not detected by control apparatus 202.

After the secure compartment is selected for use with the portable electronic device, control apparatus 202 may attempt to detect the presence of the portable electronic device in the secure compartment. For example, control apparatus 202 may perform the detection after the door (e.g., doors 212-214) of the secure compartment is closed. To detect the presence of the portable electronic device, control apparatus 202 may examine the power consumption associated with the secure compartment. For example, control apparatus 202 may compare the power consumption of one or more connectors in the secure compartment with a set of power consumption ranges to determine if the power consumption falls within a range associated with the power consumption of zero, one, or two or more electronic devices.

Control apparatus 202 may additionally use a connector (e.g., connectors 216-218) in the secure compartment to detect the presence of the portable electronic device in the secure compartment. For example, control apparatus 202 may attempt to interface with the portable electronic device over a USB cable connecting the portable electronic device to charging station 100. Such communication may be enabled by routing USB data pins from the connector and/or secure compartment to control apparatus 202. Alternatively, the communication may be performed by a separate communication mechanism coupled directly to the connectors in the secure compartment.

During the communication, control apparatus 202 and/or the communication mechanism may obtain a device identifier (e.g., serial number, etc.), device type (e.g., model, manufacturer, etc.), and/or other information from the portable electronic device. Control apparatus 202 may use the information and/or the individual connector used to register the portable electronic device with charging station 100 and subsequently detect the presence of another portable electronic device in the secure compartment, as described in further detail below.

Once the presence of the portable electronic device in the secure compartment is detected, control apparatus 202 may secure the door of the secure compartment and add the transaction to the list of ongoing transactions 204. While the portable electronic device remains in the secure compartment, the connector may supply power to a battery of the portable electronic device, and the secured door may prevent damage to and/or theft of the portable electronic device once the user leaves the vicinity of charging station 100. Control apparatus 202 may continue to secure the door until valid credentials for opening the door are subsequently provided.

Control apparatus 202 may also activate a disinfecting mechanism in the secure compartment after securing the door of the secure compartment. For example, control apparatus 202 may use an ultraviolet (UV) light disinfection mechanism to sanitize the secure compartment and/or portable electronic device. The disinfection mechanism may also be activated after the portable electronic device is removed from the secure compartment (e.g., in between uses of the secure compartment) to prepare the secure compartment for use with subsequent portable electronic devices and transactions.

Those skilled in the art will appreciate that control apparatus 202 may not be able to detect the presence of the portable electronic device in the secure compartment if control apparatus 202 is unable to detect a change in power consumption in the secure compartment and/or communicate with the portable electronic device through a connector in the secure compartment. Such lack of detection may occur if the portable electronic device is not present in the secure compartment, lacks the ability to communicate with charging station 100 through the connector in the secure compartment, and/or has a fully charged or discharged battery and thus consumes less than a "normal" amount of power.

In turn, the inability to confirm the presence or absence of the portable electronic device in the secure compartment may adversely affect the use of charging station 100 with the portable electronic device and/or other portable electronic devices. For example, a portable electronic device in a secure compartment that is identified as unoccupied may be vulnerable to theft and/or unauthorized access during a subsequent transaction involving the secure compartment. Conversely, a secure compartment that is empty but assumed to be occupied may prevent use of the secure compartment with a subsequent transaction and unnecessarily limit the availability of secure compartments in charging station 100.

To make a more definite assessment regarding the presence or absence of the portable electronic device in the secure compartment, control apparatus 202 may query the user of the portable electronic device for input related to a lack of detection of the presence and process the transaction based on the input. For example, control apparatus 202 may ask the user to confirm and/or terminate the transaction associated with charging the portable electronic device in the secure compartment. Control apparatus 202 may also request that the user confirm the transaction by providing the identifier (e.g., credit card number, numeric code, password, etc.) used to initiate the transaction. If the user confirms the transaction, control apparatus 202 may release (e.g., unlock and/or open) the door of the secure compartment and prompt the user to verify that the portable electronic device is plugged into a connector within the secure compartment. If the user verifies that the portable electronic device is plugged into the connector, control apparatus 202 may determine that the connector and/or secure compartment are malfunctioning, log an issue associated with the malfunction, and/or provide the user with a new, unused secure compartment. On the other hand, if the user confirms termination of the transaction, control apparatus 202 may release the door and prompt the user to confirm that the secure compartment is empty before re-securing the door and/or terminating the transaction.

However, the input may not be provided by the user if the user has left the vicinity of charging station 100 and/or does not notice prompts and/or requests for the input from control apparatus 202. If the input is not received from the user within a first pre-specified period (e.g., 30 seconds, one minute, etc.), control apparatus 202 may operate the secure compartment with an assumed presence of the portable electronic device in the secure compartment and periodically reattempt to detect the presence of the portable electronic device in the secure compartment. For example, control apparatus 202 may continue to secure the door of the secure compartment and remove the secure compartment from a list of unoccupied secure compartments. Control apparatus 202 may also examine the power consumption associated with the secure compartment and/or attempt to communicate with the portable electronic device through one or more connectors in the secure compartment every 15-30 seconds to try to detect the presence of the portable electronic device in the secure compartment. If the presence of the portable electronic device is subsequently detected, control apparatus 202 may confirm use of the secure compartment and add the transaction to the list of ongoing transactions 204.

If control apparatus 202 is still unable to detect the presence of the portable electronic device after a second pre-specified period (e.g., 90-180 minutes), control apparatus 202 may end the transaction and/or identify the secure compartment as unoccupied. For example, control apparatus 202 may add the secure compartment to a list of unoccupied secure compartments so that the secure compartment may be selected for use with a subsequent transaction. Consequently, control apparatus 202 may reduce the risk of unauthorized access to the portable electronic device in the secure compartment by preventing use of the secure compartment with another transaction while attempting to detect the portable electronic device in the secure compartment. On the other hand, control apparatus 202 may balance the risk with the reduced use of charging station 100 associated with the unavailability of unoccupied secure compartments by re-enabling use of the secure compartment after a number of unsuccessful attempts to detect the portable electronic device in the secure compartment.

Control apparatus 202 may also include functionality to detect and manage the presence of another portable electronic device in the secure compartment before the transaction is terminated. The other portable electronic device may be plugged into a connector in the secure compartment as a substitute for or in addition to the portable electronic device associated with initiation of the transaction. For example, the user and/or another user may provide the identifier used to initiate the transaction to open the door of the secure compartment. The user and/or other user may then replace the portable electronic device with the other portable electronic device or connect the other portable electronic device to a different connector in the secure compartment before closing the door and attempting to continue the transaction with the other portable electronic device in the secure compartment.

As mentioned above, the presence of one or more portable electronic devices in the secure compartment may be detected by monitoring the power consumption associated with the secure compartment and/or communicating with the portable electronic device(s) through one or more connectors in the secure compartment. The presence of the other portable electronic device in the secure compartment may thus be detected if the power consumption in the secure compartment increases significantly, the other portable electronic device is connected to a different connector in the secure compartment, and/or a serial number, model, manufacturer, and/or other device information associated with a different portable electronic device are detected through one or more connectors in the secure compartment.

If the other portable electronic device is detected in the secure compartment, control apparatus 202 may query the user for additional input related to the detected presence of the other portable electronic device and process the transaction based on the additional input. For example, control apparatus 202 may notify the user of the presence of the other portable electronic device in the secure compartment and request that the user remove the other portable electronic device or provide information (e.g., payment information, identifier, etc.) for conducting a transaction with the charging station. Control apparatus 202 may also prevent the door of the secure compartment from closing to prompt the user to take action before leaving the vicinity of charging station 100. If the information matches the current transaction associated with the secure compartment, control apparatus 202 may continue the transaction with the other portable electronic device, possibly with an added fee for charging the other portable electronic device. If the information does not match the current transaction, control apparatus 202 may end the transaction and initiate a new transaction with the information. By tracking the use of the secure compartment with different portable electronic devices, control apparatus 202 may prevent users from obtaining an unauthorized "free charge" on a new portable electronic device with an ongoing transaction. At the same time, control apparatus 202 may reduce confusion associated with access to the secure compartment and/or the portable electronic device(s) in the secure compartment, thus facilitating safe and/or proper use of charging station 100.

As described in the above-referenced application, the transaction may continue until the user provides the same identifier used to initiate the transaction to control apparatus 202. Control apparatus 202 may match the identifier to an ongoing transaction from the list of ongoing transactions 204, identify the secure compartment associated with the ongoing transaction, and release the door of the secure compartment to enable access to the portable electronic device and/or removal of the portable electronic device from the secure compartment. Control apparatus 202 may then continue the transaction if the portable electronic device is still in the secure compartment or terminate the transaction if the portable electronic device is no longer detected as present in the secure compartment.

Those skilled in the art will appreciate that the system of FIG. 2 may be implemented in a variety of ways. First, control apparatus 202 may be provided by a combination of components, including an embedded controller, microprocessor, field-programmable gate array (FPGA), application-specific integrated circuit (ASIC), and/or one or more software components. In addition, charging station 100 may facilitate interaction with different users by providing a variety of I/O devices, such as microphones, speakers, keyboards, biometric scanners, and/or buttons, in lieu of and/or in addition to display 102 and/or card reader 104.

Along the same lines, control apparatus 202 may utilize a number of techniques to detect the presence of one or more portable electronic devices in a secure compartment. As mentioned above, control apparatus 202 may identify one or more distinct portable electronic devices in the secure compartment based on the power consumption associated with the secure compartment, the connection of the portable electronic device(s) to individual connectors in the secure compartment, and/or communication with the portable electronic device(s) through the connector(s). Control apparatus 202 may use other mechanisms to detect the portable electronic device(s) in the secure compartment, including cameras, pressure pads, microswitches, and/or optical switches.

Figure 3:
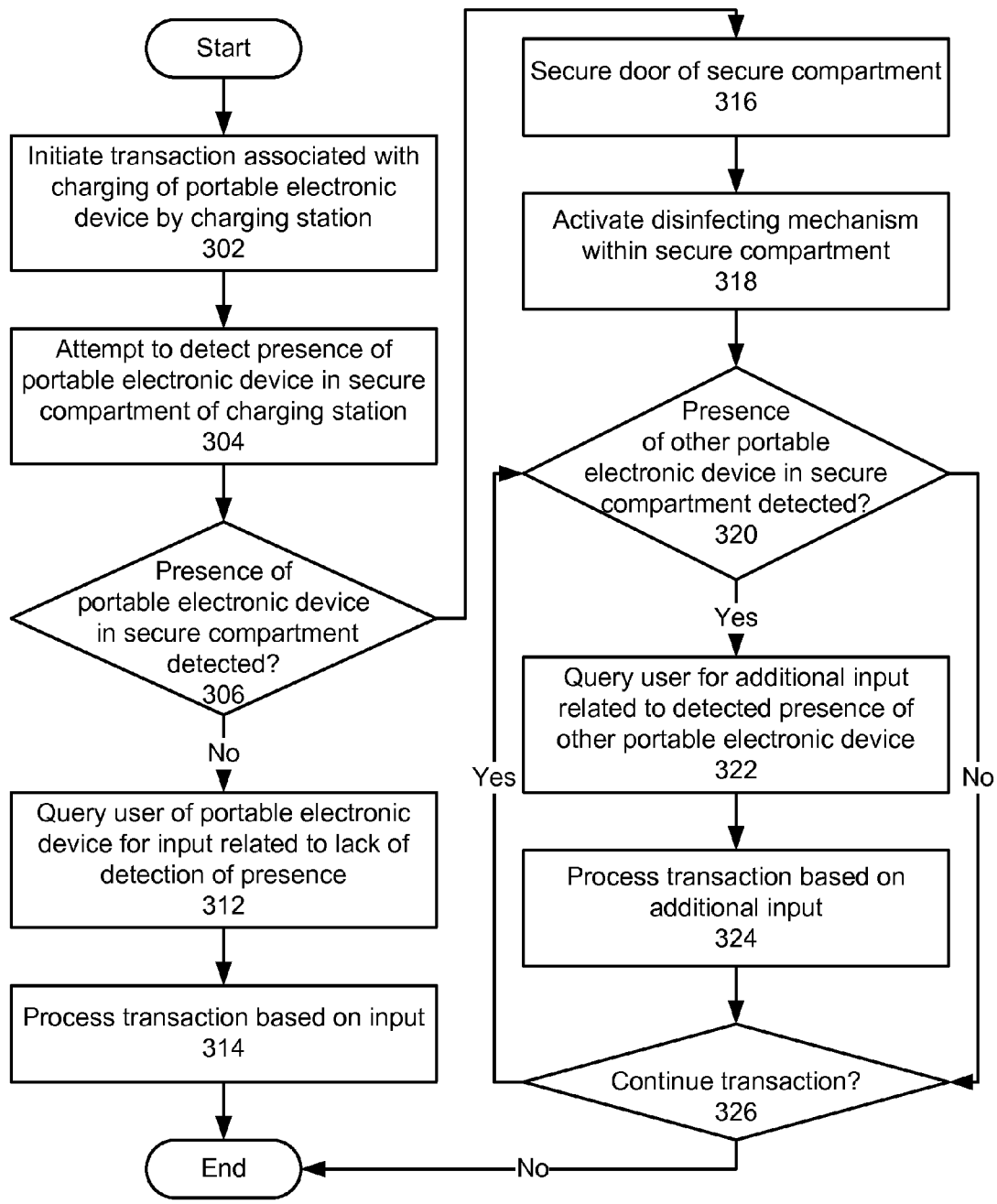
FIG. 3 shows a flowchart illustrating the process of operating a charging station for a portable electronic device in accordance with one or more embodiments.

FIG. 3 shows a flowchart illustrating the process of operating a charging station for a portable electronic device in accordance with one or more embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a transaction associated with charging of the portable electronic device by the charging station is initiated (operation 302). The transaction may be initiated after obtaining an identifier (e.g., credit card number, debit card number, numeric code, name, email address, phone number, etc.) for the user that does not match an ongoing transaction associated with charging of the portable electronic device by the charging station.

During initiation of the transaction, a secure compartment may be selected for use with the portable electronic device. In addition, the secure compartment may be selected based on a set of ongoing transactions with the charging station, a set of recently ended transactions with the charging station, a number of uses of the secure compartment, and/or a compatibility of a connector in the secure compartment with the portable electronic device. For example, the secure compartment may be selected as an unused secure compartment that was not recently used, is associated with fewer uses than other secure compartments in the charging station, and/or contains a connector (e.g., Micro-USB, Lightning, 30-pin) that is compatible with the portable electronic device. Alternatively, an secure compartment associated with a recently ended transaction with the charging station that matches the identifier may be selected if the secure compartment is not occupied.

Next, an attempt to detect the presence of the portable electronic device in a secure compartment of the charging station is made (operation 304). The presence of the electronic device may be detected by monitoring the power consumption associated with the secure compartment and/or attempting to communicate with the portable electronic device through a connector in the secure compartment. During the communication, a device identifier and/or device type may be obtained from the portable electronic device and used to register the portable electronic device with the charging station.

The secure compartment may be operated based on detection of the presence of the portable electronic device in the secure compartment (operation 306). If the presence of the portable electronic device in the secure compartment is not detected, a user of the portable electronic device is queried for input related to the lack of detection of the presence (operation 312), and the transaction is processed based on the input (operation 314), as described in further detail below with respect to FIG. 4.

If the presence of the portable electronic device in the secure compartment is detected, the door of the secure compartment is secured (operation 316), and a disinfecting mechanism is activated within the secure compartment (operation 318) to sanitize the secure compartment and/or portable electronic device. While the door is secured, power is supplied to the portable electronic device, and the transaction is kept in a list of ongoing transactions with the charging station.

The presence of another portable electronic device in the secure compartment may also be detected (operation 320) during use of the secure compartment with the portable electronic device. For example, the other portable electronic device may be detected in the secure compartment if the power consumption associated with the secure compartment increases significantly and/or a device identifier and/or device type that differ from those of the portable electronic device are detected through a connector in the secure compartment. If the presence of the other portable electronic device in the secure compartment is not detected, the transaction may be continued (operation 326) with the portable electronic device in the secure compartment.

If the presence of the other portable electronic device in the secure compartment is detected, the user is queried for additional input related to the detected presence of the other portable electronic device (operation 322), and the transaction is processed based on the additional input (operation 324). For example, the user may be prompted to remove the other portable electronic device and/or provide an identifier to enable charging of the other electronic device in the secure compartment. If the identifier does not match the transaction, the transaction may be ended and a new transaction may be initiated with the identifier. If the identifier matches the transaction, the transaction may continue (operation 326) with the other portable electronic device, with or without an additional fee for charging the other portable electronic device on the same transaction.

The transaction may continue (operation 326) during use of the secure compartment with the portable electronic device and/or the other portable electronic device (operations 320-324). To end the transaction, the user may provide the same identifier used to initiate the transaction to the charging station. After the identifier is matched to the transaction, the door of the secure compartment may be released to allow the user to retrieve the portable electronic device from the secure compartment.

Figure 4:
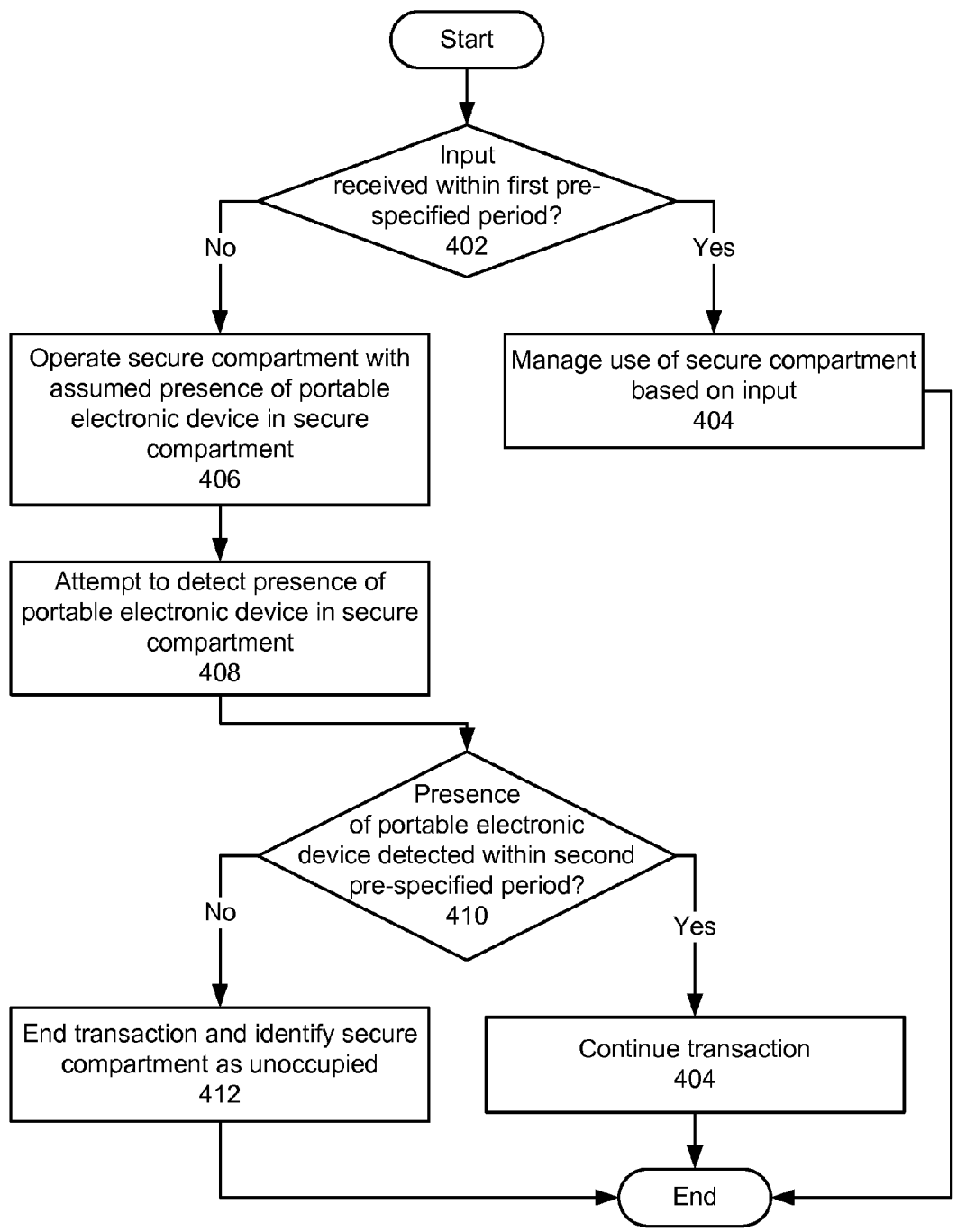
FIG. 4 shows a flowchart illustrating the processing of input related to a lack of detection of a presence of a portable electronic device in a secure compartment of a charging station in accordance with one or more embodiments.

FIG. 4 shows a flowchart illustrating the processing of input related to a lack of detection of a presence of a portable electronic device in a secure compartment of a charging station in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

First, the input may be received within a first pre-specified period (operation 402). For example, the user of the portable electronic device may be prompted to cancel the transaction, connect the portable electronic device to the charging station, and/or provide an identifier to continue the transaction if the presence of the portable electronic device in the secure compartment is not detected after the door of the secure compartment is closed. The prompting may also continue for a number of seconds (e.g., 30-60) to allow the user to provide the input.

If the input is received within the first pre-specified period, the use of the secure compartment is managed based on the input (operation 404). For example, the transaction may be cancelled and/or continued according to the user's selection of an option to cancel and/or continue the transaction. The subsequent detection of the portable electronic device in the secure compartment (e.g., after the user connects the portable electronic device to a connector in the secure compartment) may also be used to implicitly confirm and/or continue the transaction. On the other hand, if the user confirms that the portable electronic device has been plugged into the connector and the presence of the portable electronic device in the secure compartment is still not detected, an issue associated with a malfunction in the secure compartment may be logged, and the user may be provided with a new, unoccupied secure compartment with which to charge the portable electronic device.

If the input is not received within the pre-specified period, the secure compartment is operated with an assumed presence of the portable electronic device in the secure compartment (operation 406). For example, the door of the secure compartment may be secured, and the transaction associated with the secure compartment may be added to a list of ongoing transactions with the charging station. Attempts to detect the presence of the portable electronic device in the secure compartment may also be made (operation 408). For example, the power consumption associated with the secure compartment and/or communication over data pins associated with interfaces in the secure compartment may be monitored periodically to detect the portable electronic device in the secure compartment.

Attempts to detect the presence of the portable electronic device in the secure compartment may continue within a second pre-specified period (operation 410). For example, the secure compartment may be considered occupied, and attempts to detect the presence of the portable electronic device in the secure compartment may be made for a number of minutes after the first pre-specified period has lapsed. During the second pre-specified period, the portable electronic device may establish communication with the charging station and/or begin drawing power from the secure compartment, thus enabling detection of the portable electronic device's presence in the secure compartment.

If the presence of the portable electronic device in the secure compartment is detected within the second pre-specified period, the transaction is continued (operation 404) until further input is received from the user. If the presence of the portable electronic device in the secure compartment is not detected within the second pre-specified period, the transaction is ended, and the secure compartment is identified as unoccupied (operation 412). As a result, the charging station may initially increase the likelihood of detecting the portable electronic device in the secure compartment while preventing unauthorized access to and/or theft of the portable electronic device from the secure compartment. The charging station may then resume use of the secure compartment with other portable electronic devices and/or transactions if the portable electronic device continues to not be detected in the secure compartment to increase the use and/or availability of secure compartments in the charging station.

Although the disclosed embodiments have been described with respect to a limited number of embodiments, those skilled in the art, having benefit of this disclosure, will appreciate that many modifications and changes may be made without departing from the spirit and scope of the disclosed embodiments. Accordingly, the above disclosure is to be regarded in an illustrative rather than a restrictive sense. The scope of the embodiments is defined by the appended claims.

What is claimed is:

1. A method of operating a charging station for a portable electronic device, comprising:
   upon initiating a transaction associated with charging of the portable electronic device by the charging station, attempting to detect a presence of the portable electronic device in a secure compartment of the charging station, wherein power is supplied to the portable electronic device within the secure compartment;
   if the presence of the portable electronic device in the secure compartment is detected, securing a door of the secure compartment;
   if the presence of the portable electronic device in the secure compartment is not detected:
      querying a user of the portable electronic device for input related to a lack of detection of the presence; and
      processing the transaction based on the input;
   upon detecting a presence of another portable electronic device in the secure compartment, querying the user for additional input related to the detected presence of the other portable electronic device and processing the transaction based on the additional input.

2. The method of claim 1, wherein the additional input comprises at least one of:
   removal of the other portable electronic device; and
   an identifier for the user.

3. The method of claim 2, wherein processing the transaction based on the additional input involves:
   ending the transaction and initiating a new transaction if the identifier does not match the transaction; and continuing the transaction with the other portable electronic device if the identifier matches the transaction.

4. A charging station, comprising:

a set of secure compartments, wherein each of the secure compartments is configured to supply power to a portable electronic device; and a control apparatus configured to:

upon initiating a transaction associated with charging of the portable electronic device by the charging station, attempt to detect a presence of the portable electronic device in a secure compartment from the set of secure compartments;

if the presence of the portable electronic device in the secure compartment is detected, secure a door of the secure compartment; and if the presence of the portable electronic device in the secure compartment is not detected:

query a user of the portable electronic device for input related to a lack of detection of the presence; and process the transaction base on the input; and upon detecting a presence of another portable electronic device in the secure compartment, query the user for additional input related to the detected presence of the other portable electronic device and process the transaction based on the additional input.

5. The charging station of claim 4, wherein processing the transaction based on the additional input involves:

obtaining an identifier for the user from the additional input;

ending the transaction and initiating a new transaction if the identifier does not match the transaction; and continuing the transaction with the other portable electronic device if the identifier matches the transaction.

* * * * *